United States Patent [19]

Robinson

[11] Patent Number: 5,339,172
[45] Date of Patent: Aug. 16, 1994

[54] APPARATUS AND METHOD FOR SEGMENTING AN INPUT IMAGE IN ONE OF A PLURALITY OF MODES

[75] Inventor: David C. Robinson, Penfield, N.Y.

[73] Assignee: Xerox Corporation, Stamford, Conn.

[21] Appl. No.: 76,072

[22] Filed: Jun. 11, 1993

[51] Int. Cl.⁵ .............................................. H04N 1/40
[52] U.S. Cl. .................................. 358/462; 358/453; 358/467; 382/9
[58] Field of Search ............... 358/448, 452, 453, 455, 358/456, 458, 459, 462, 464, 467; 382/9

[56] References Cited

U.S. PATENT DOCUMENTS

| | | | |
|---|---|---|---|
| 3,294,896 | 7/1963 | Young, Jr. | 358/283 |
| 4,194,221 | 3/1980 | Stoffel | 358/283 |
| 4,251,837 | 2/1981 | Janeway, III | 358/283 |
| 4,509,195 | 4/1985 | Nadler | 382/51 |
| 4,547,811 | 10/1985 | Ochi et al. | 358/283 |
| 4,556,918 | 12/1985 | Yamazaki et al. | 358/283 |
| 4,559,563 | 12/1985 | Joiner, Jr. | 358/283 |
| 4,578,714 | 3/1986 | Sugiura et al. | 358/283 |
| 4,730,221 | 3/1988 | Roefling | 358/283 |
| 4,736,253 | 4/1988 | Shida | 358/283 |
| 4,811,115 | 3/1989 | Lin et al. | 358/283 |
| 4,924,509 | 5/1990 | Yokomizo | 358/456 |
| 5,018,024 | 5/1991 | Tanioka | 358/457 |
| 5,025,481 | 6/1991 | Ohuchi | 382/53 |

FOREIGN PATENT DOCUMENTS 2153619  8/1985  United Kingdom .......... H04N 1/40

Primary Examiner—Edward L. Coles, Sr.
Assistant Examiner—Jerome Grant, II
Attorney, Agent, or Firm—Gary B. Cohen

[57] ABSTRACT

An image processing apparatus for processing an image represented by a plurality of pixels corresponding with a plurality of image intensity signals, respectively, is provided. A selected one of the image intensity signals corresponding with a first image type is processed, in parallel with an image type determining arrangement, a first image processing module and a second image processing module. Preferably, the first image processing module has an output and is adapted to process images of the first image type, while the second image processing module has an output and is adapted to process images of a second type. The image processing apparatus includes: a first memory section, communicating with the image type determining arrangement, the first image processing module and the second image processing module, for buffering the plurality of the image intensity signals; a second memory section for receiving image intensity signals processed with the image processing modules; and a control section, communicating with the image type determining arrangement, the image processing modules and the second memory section for causing the output signal from the second image processing module to be received by the second memory section when the selected image intensity signal is of the first image type.

26 Claims, 10 Drawing Sheets

APPARATUS AND METHOD FOR SEGMENTING AN INPUT IMAGE IN ONE OF A PLURALITY OF MODES

The present invention relates generally image processing of documents in a printing system and, more particularly, an improved technique for controlling an image processing arrangement to minimize the misclassification of image types in a document with a plurality of image types.

In the reproduction of copies of an original from video image data created, for example, by electronic raster input scanning from an original document, one is faced with the limited resolution capabilities of the reproducing system and the fact that output devices are mostly binary. This is particularly evident when attempting to reproduce halftones, lines and continuous tone images. Of course, an image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of high frequency halftones, low frequency halftones, continuous tones, or line copy, or a combination, in some unknown degree, of some or all of the above. In the face of these possibilities, optimizing the image processing system for one image type in an effort to offset the limitations in the resolution capability of the reproducing apparatus used, may not be possible, requiring a compromise choice which may not produce acceptable results. Thus, for example, where one optimizes the system for low frequency halftones, it is often at the expense of degraded reproduction of high frequency halftones, or of line copy, and vice versa.

In U.S. Pat. No. 4,194,221 to Stoffel (Issued: Mar. 18, 1980), this problem was addressed by applying a discrimination function instructing the image processing system as to the type of image data present and particularly, an auto correlation function to the stream of pixel data, to determine the existence of halftone image data. Such a function is expressed as:

$$A(n) = \sum_{t=0}^{t=\text{last}} p(t) \times p(t+n) \quad (1)$$

where
n=the bit or pixel number;
p=the pixel voltage value; and
t=the pixel position in the data stream.

Stoffel describes a method of processing automatically a stream of image pixels representing unknown combinations of high and low frequency halftones, continuous tones, and/or lines to provide binary level output pixels representative of the image. The described function is applied to the stream of image pixels and, for the portions of the stream that contained high frequency halftone image data, notes a large number of closely spaced peaks in the resultant signal.

Additionally, Stoffel describes an arrangement in which one image processing module can be used to process both high frequency and continuous tone image regions selectively. As shown in FIG. 11, and discussed in the accompanying text, a user controls the state of the module through use of a manual switch.

In U.S. Pat. No. 4,811,115 to Lin et al (Issued: Mar. 7, 1989), the auto correlation function is calculated for the stream of halftone image data at selected time delays which are predicted to be indicative of the image frequency characteristics, without prior thresholding. The arithmetic function used in that auto correlation system is an approximation of the auto correlation function using logical functions and addition, rather than the multiplication function used in U.S. Pat. No. 4,194,221 to Stoffel. Valleys in the resulting auto correlated function are detected to determine whether high frequency halftone image data is present.

GB 2,153,619A (Publication Date: Aug. 21, 1985) provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image.

Other patents of interest include U.S. Pat. No. 4,556,918 to Yamazaki et al. (Issued: Dec. 3, 1985) showing an arrangement assuming a periodicity of an area of halftone dots which are thresholded against an average value derived from the area to produce a density related video signal; U.S. Pat. No. 4,251,837 to Janeway, Ill. (Issued: Feb. 17, 1981) which shows the use of a three decision mode selection for determining threshold selection based on gradient constants for each pixel; U.S. Pat. No. 4,578,714 to Sugiura et al. (Issued: Mar. 25, 1986) which shows random data added to the output signal to eliminate pseudo-outlines; U.S. Pat. No. 4,559,563 to Joiner, Jr. (Issued: Dec. 17, 1985) suggests an adaptive prediction for compressing data based on a predictor which worked best for a previous pixel block; and U.S. Pat. No. 3,294,896 to Young, Jr. (Issued: Dec. 27, 1966) teaches the usefulness of thresholding in producing an image from a binary digital transmission system.

U.S. Pat. No. 4,509,195 to Nadler (Issued: Apr. 2, 1985) describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al. (Issued: Oct. 15, 1985) teaches a method of processing gray level values, depending on the density level of blocks of pixels, and their difference from a minimum or maximum value. The blocks are then processable by a halftone processing matrix depending on the difference value, U.S. Pat. No. 4,730,221 to Roetling (Issued: Mar. 8, 1988) discloses a screening technique where values of gray over an image are evaluated to determine a minimum and maximum level, in order to determine constant levels of gray. U.S. Pat. No. 4,736,253 to Shida (Issued: Apr. 5, 1988) discloses a method of producing a halftone dot by selectively comparing image signals with highlight and shadow reference values, for determination of the binarization process. U.S. Pat. No. 5,018,024 to Tanioka (Issued: May 21, 1991) discloses an apparatus for reproducing half tone image, line image and dot image by distinguishing the nature of an original image. The image is discriminated by the distribution of its spatial frequency. U.S. Pat. No. 5,025,481 to Ohuchi (Issued: Jun. 18, 1991) discloses a method for halftone (dot) region discrimination.

Under ideal conditions, the above-mentioned image segmenting arrangement of Stoffel accurately classifies one of four image types for a given region of an input image. It is not uncommon, however, for the segmenting arrangement to misclassify regions of relatively complex input images. For example, pixels classified as continuous tones can, in fact, be text pixels. Misclassified regions are typically reproduced in an incorrect manner and result in poor image quality. There are circumstances in which a user is aware that certain image types are not present in the input image. It would be desirable to use this awareness, with the Stoffel arrangement, to prevent the misclassification of pixels.

In accordance with a disclosed embodiment of the present invention there is provided an image processing apparatus for processing an image represented by a plurality of pixels corresponding with a plurality of image related signals, respectively, a selected one of the image related signals corresponding with a first image type and being processed, in parallel, with means for determining the image type of selected ones of the image related signals, a first image processing module and a second image processing module, the first image processing module having an output and being adapted to process images of the first image type and the second image processing module having an output and being adapted to process images of a second type, including: a first memory section, communicating with the determining means, the first image processing module and the second image processing module, for buffering the plurality of the image related signals; a second memory section for receiving image related signals processed with the image processing modules; and a control section, communicating with the determining means, the image processing modules and the second memory section for causing the output signal from the second image processing module to be received by the second memory section when the selected image related signal is of the first image type.

These and other aspects of the invention will become apparent from the following description, the description being used to illustrate a preferred embodiment of the invention when read in conjunction with the accompanying drawings.

Figure 7:
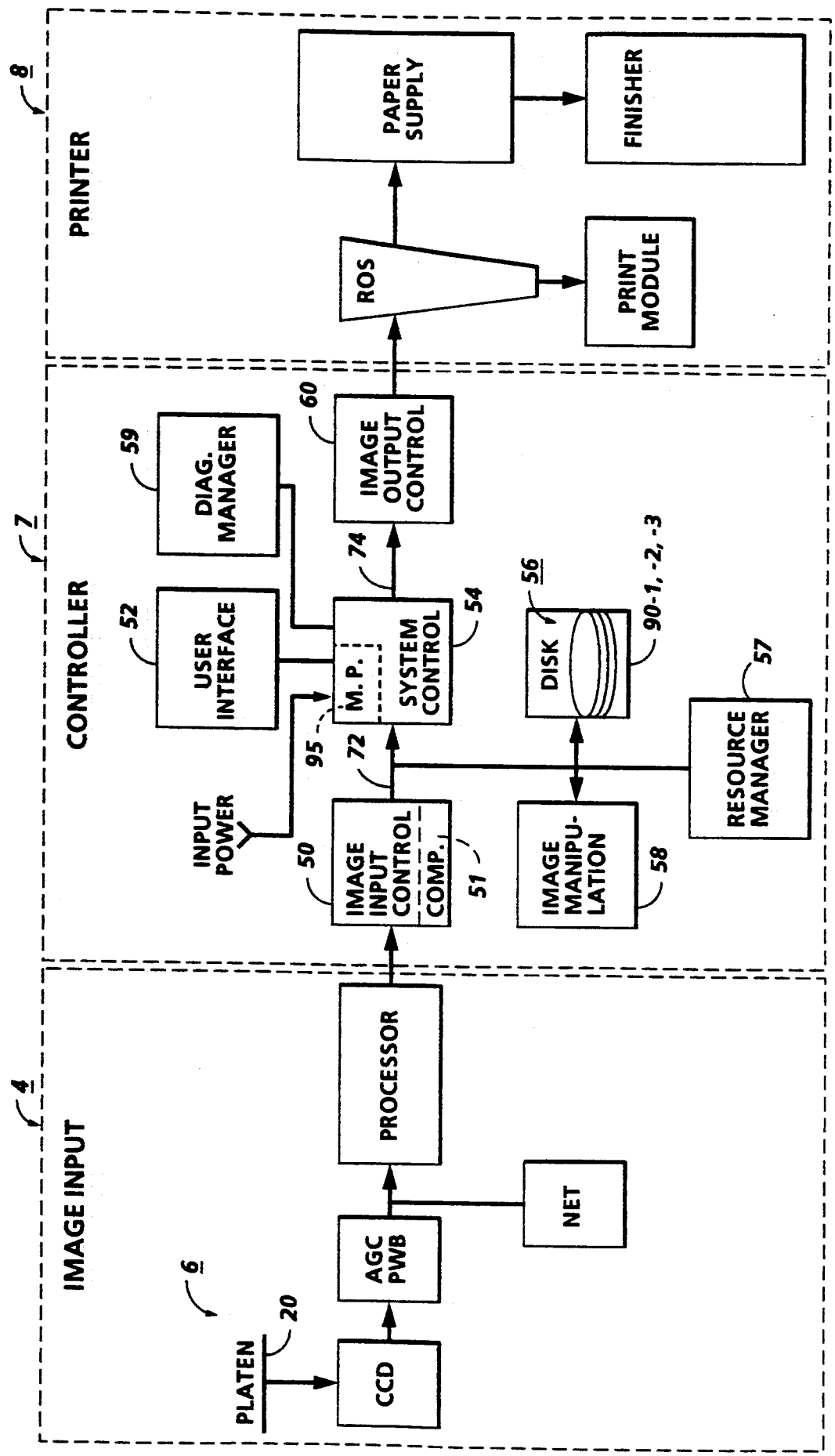
FIG. 7 is a block diagram of the electronic printing system of FIG. 1.
Figure 8:
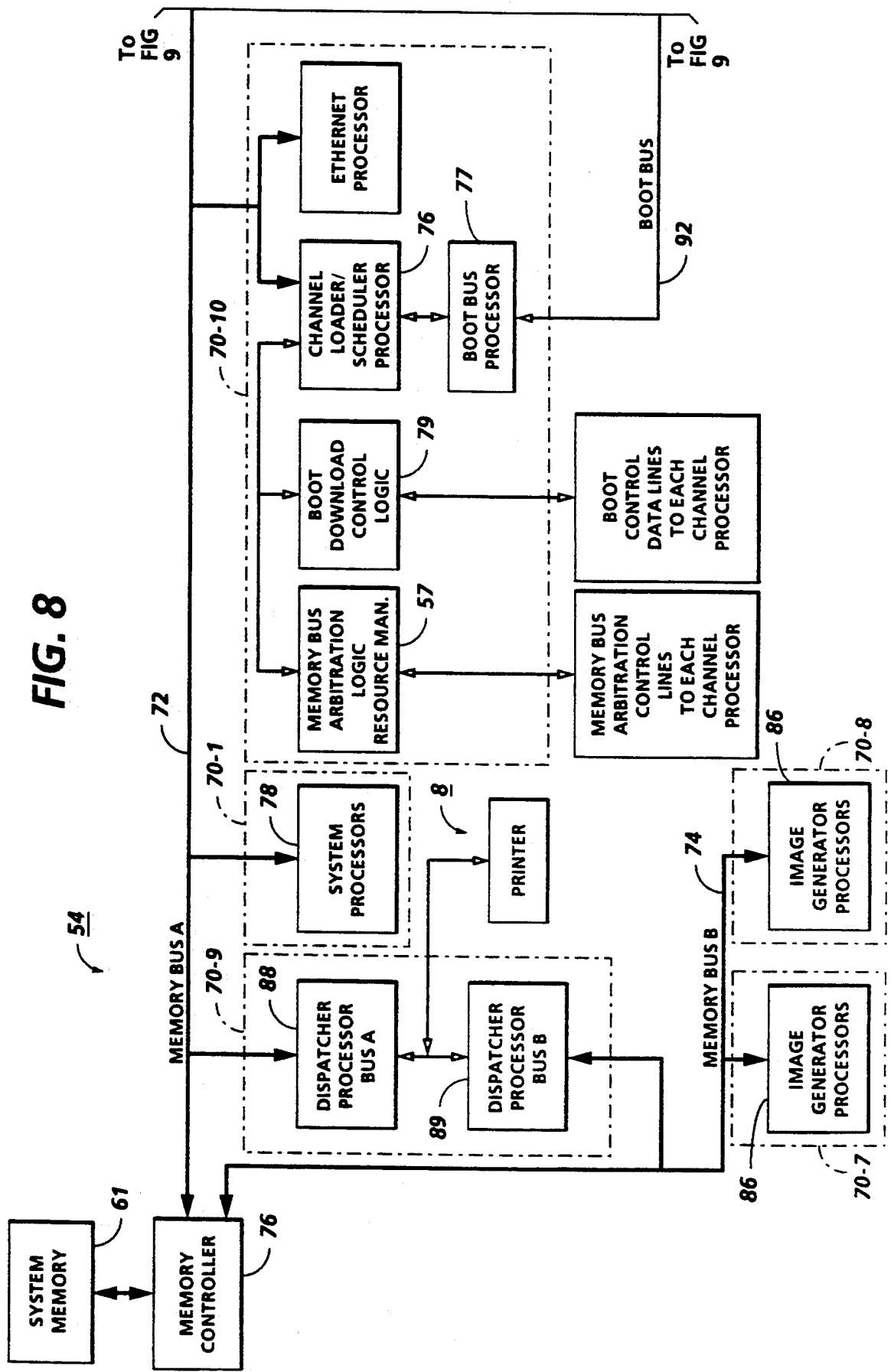
Figure 9:
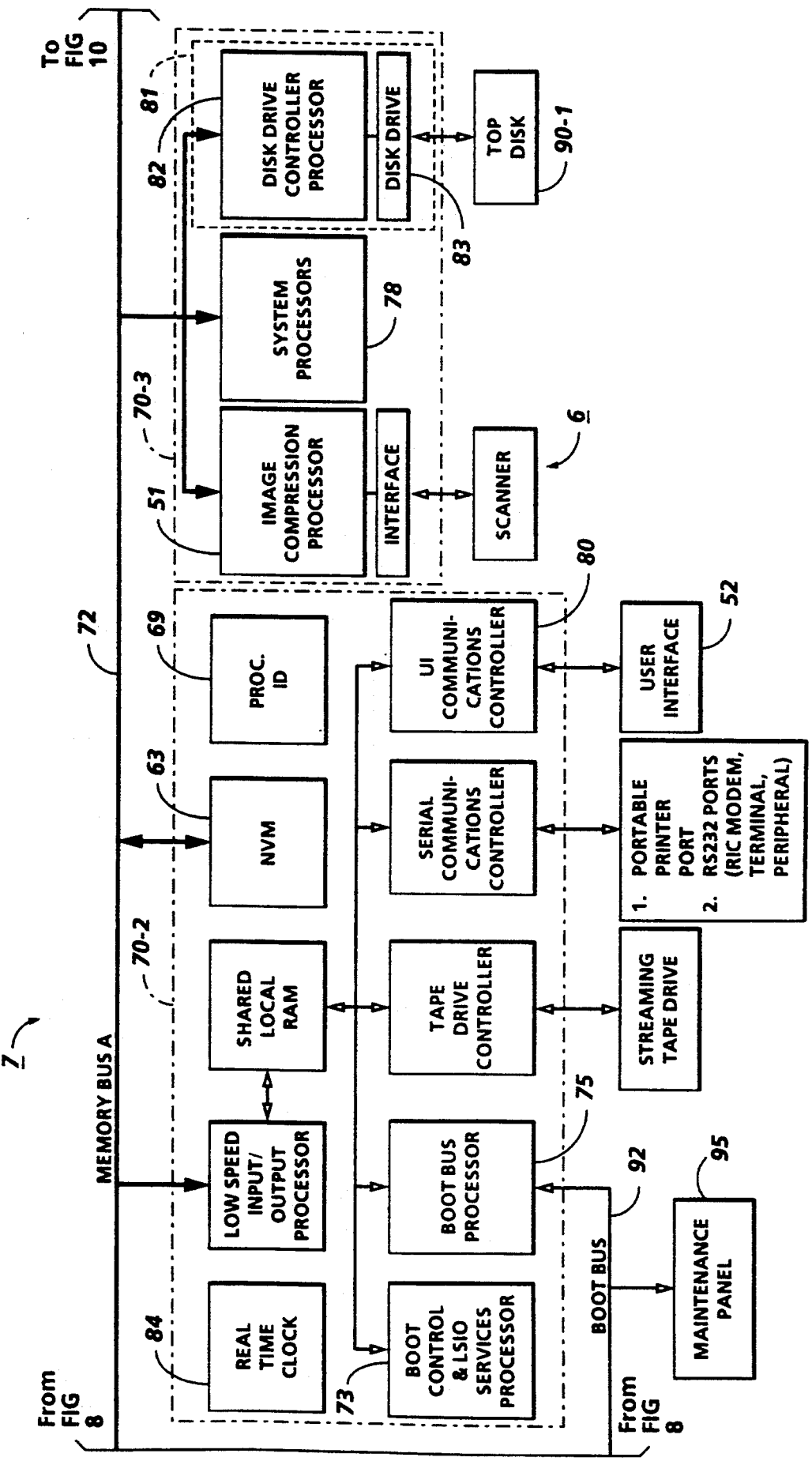
Figure 10:
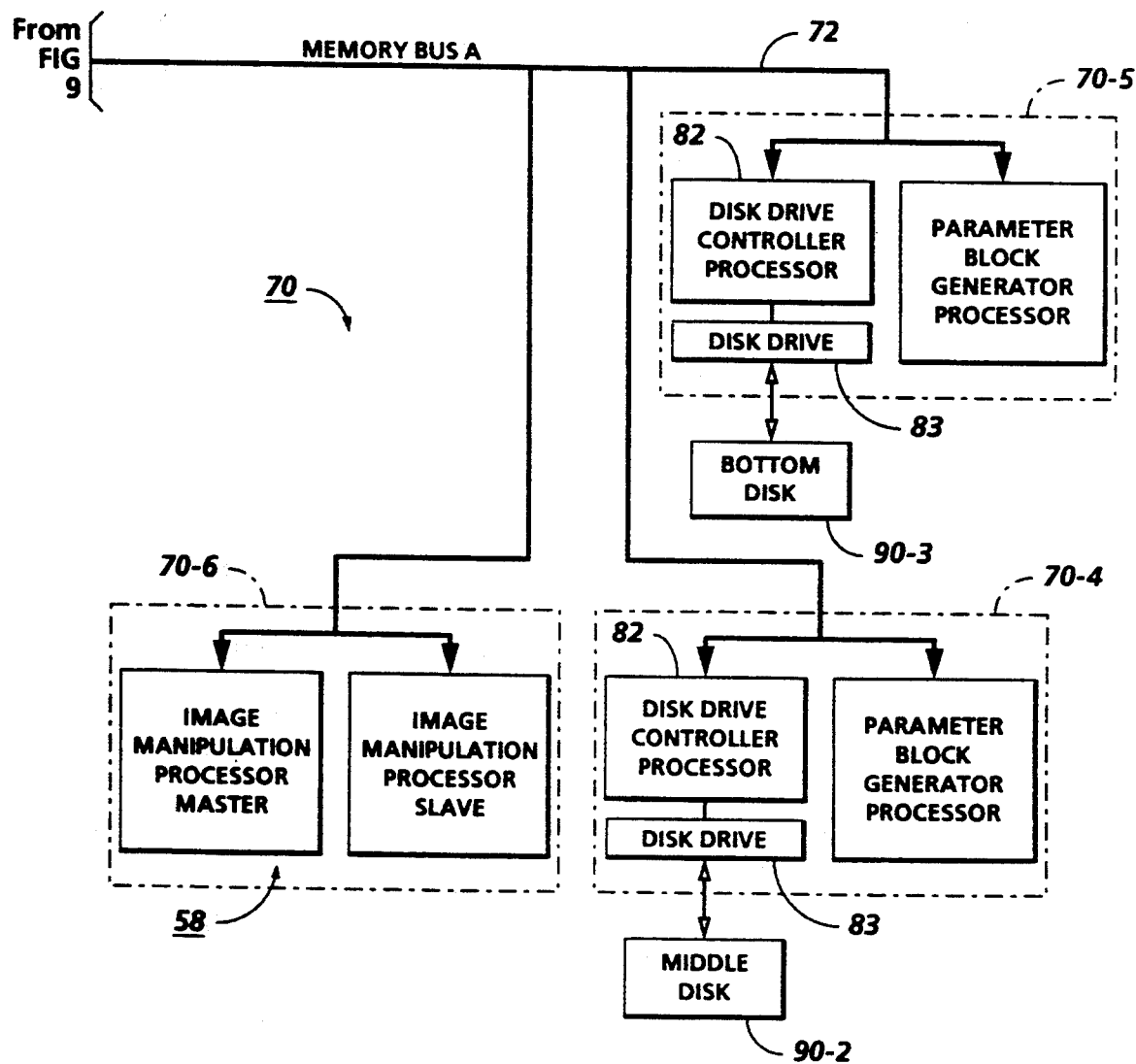

FIGS. 8–10 conjunctively represent a block diagram of the controller section of FIG. 7.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 6:
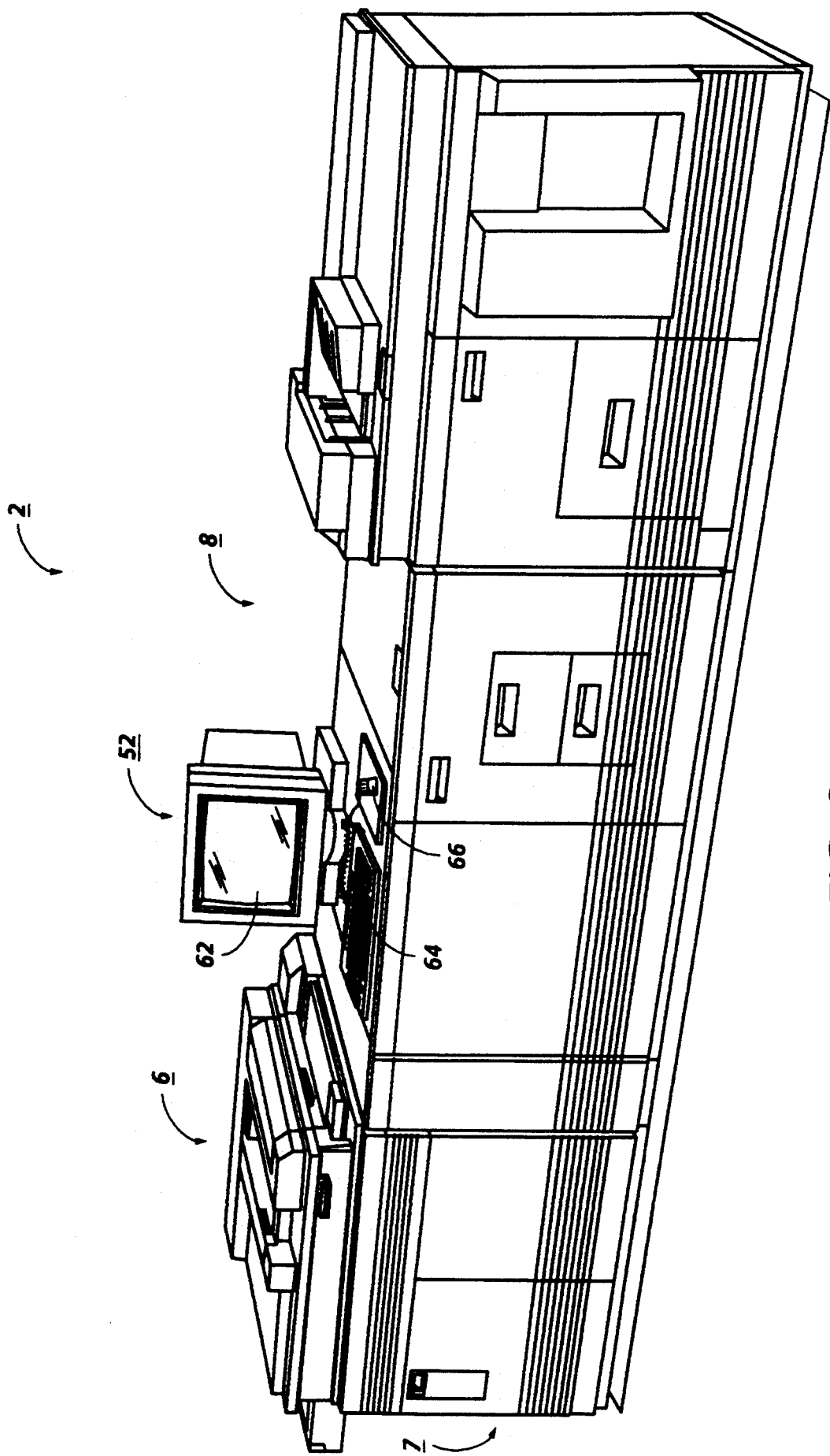
FIG. 6 is a perspective view of an electronic printing machine in which the image processing apparatus of FIG. 1 can be employed.

Referring to drawings where like reference numerals designate identical or corresponding parts throughout the several views, and more particularly to FIGS. 6 and 7, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application Ser. No. 07/620,519, filed Nov. 30, 1990, to James R. Graves et al, and entitled "System for Scanning Signature Pages", the disclosure of which is incorporated by reference herein.

Referring to FIG. 7, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 6, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point a cursor to the item selected and keying the mouse.

Referring to FIGS. 7–10, the scanned image data input from scanner section 6 to controller section 7 is compressed by image compressor/processor 51 of image input controller 50 on PWB 70-3. The compressed image data with related image descriptors are placed in image files and temporarily stored in system memory 61 pending transfer to main memory 56 where the data is held pending use. A preferred procedure for storing image files is discussed below.

When the compressed image data in memory 56 requires further processing, or is required for display on touchscreen 62 of UI 52, or is required by printer section 8, the data is accessed in memory 56 and transferred to system memory 61. Where further processing other than that provided by processor of image input section 4 is required, the data is transferred to image manipulation section 58 on PWB 70-6 where additional processing steps such as collation, make ready (document editing), decomposition, rotation, etc. are carried out. Following processing, the data may be returned to main memory 56, sent to UI 52 for display on touchscreen 62, or sent to image output controller 60.

Resource Manager 57 controls access to disks and RAM 61 of files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 8-10, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control & LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of main memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. Loader/Scheduler Processor 76 has two functions, one as a Boot channel to bring the system to the ready state and the other as a scheduler channel used to decide which channel performs which task and in which sequence the tasks will be performed.

In operation of the printing system 2, image data in the form of video image data picture elements, (hereinafter, pixels), which may be either analog or digital voltage representations of the image, is provided from a suitable source such as the scanner 6 (FIG. 7) or a network input. In one example, the image data pixels are obtained through line by line scanning of an image bearing original by one or more photosensitive element, such as a multiple photosite array of charge coupled devices, commonly referred to as CCDs. Line by line scanning of an image bearing original for the derivation of image data is well known and does not form a part of the present invention.

In content, the original may be composed entirely of lines, or low frequency halftone image(s), or high frequency halftone image(s), or continuous tone image(s), or combinations thereof. Where the original consists of lines, as for example a typed page, the image pixels may be converted to either one of two voltage levels, one representing non-image or background areas and the other image areas.

A continuous tone image comprises an unscreened image, typically a photograph. When scanned, the voltage values of the pixels produced are representative of the gray levels making up the picture.

A halftone image, typically a picture or scene, is one which has been reproduced through a screening process. One example is a newspaper picture. The screen used may be either a high or low frequency screen. A high frequency screen is arbitrarily defined herein as one having a frequency of 100 cycles per inch or more, while a low frequency screen is defined as one having a frequency less than 100 cycles per inch. Halftone images, therefore, comprise a pattern of discrete dots, the frequency of which depends upon the screening frequency used.

Figure 1:
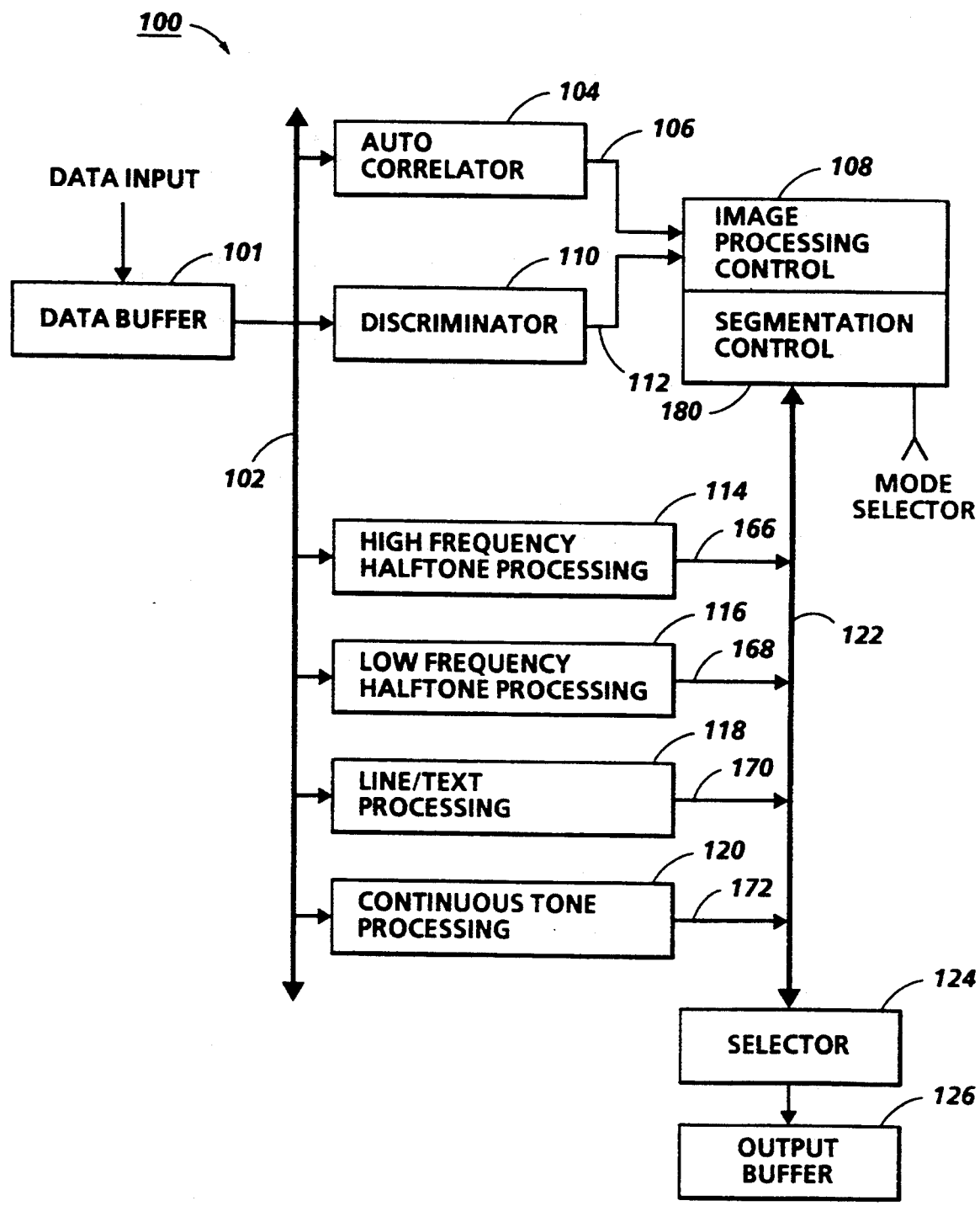
FIG. 1 is a schematic view of a multi-mode image processing apparatus used to implement the present invention.

Referring to FIG. 1 an image input processing arrangement for handling image data, is designated by the numeral 100. The stream of image pixels from an image data input is fed to a data buffer 101. Buffer 101, which comprises any suitable commercially available serial in/serial out multi-row buffer having a bit storage capacity sufficient to temporarily store lines of image pixels, permits processing of image data in blocks of several lines. While the arrangement 100 is used to classify image data on a pixel-by-pixel basis, as will appear, the image type of a given pixel can be made by reference to a plurality of pixels, e.g. a block of image pixels.

Image data is made available to the image processing system along data bus 102. Image data at this point is in its raw gray format, for example, 6-8 bits per pixel. To detect the presence of high frequency halftone image data, a one dimensional block of image pixels is unloaded from buffer 101 onto the data bus 102. The block of image pixels is passed to halftone detector 104 which auto correlates each pixel group in accordance with a predetermined algorithm to determine if the image data contains halftones or not. An output on line 106 instructs the image processing control 108 to handle the data in accordance with whether high or frequency halftone image data has been detected. A suitable block size is 16 pixels at a time at 400 spots/inch, or 12 pixels at a time at 300 spots/inch. Too large a sample size has a tendency to cause a blurred result, while too small a sample size does not contain a large enough amount of data for a good sample of the function. Either case results in inaccuracies in detecting halftone image data.

The presence of line copy and/or continuous tone data is determined by discriminator 110. Discriminator 110 functions to produce an output on line 112 indicative of the presence of line copy or continuous tone image data, instructing image processing control 108 to handle data in accordance therewith.

Image processing control 108 serves essentially as a switch to allow data from the image processing sections, including high frequency halftone processing section 114, low frequency halftone processing 116, line image processing section 118 and continuous tone processing section 120, to flow through a bus 122 to an output buffer 126 in accordance with the detection of data in the particular mode. Image processing control 108 controls data bus 122 to allow data flow from each processing section, in accordance with the signals passed thereto from halftone detector 104 or discriminator 110. Each processing section processes all image data in accordance with its function, but only that data appropriately processed is allowed to pass to a selector 124 and then an output buffer 126. Data improperly processed is discarded. For further details regarding the image processing arrangement 100, reference is made to U.S. Pat. No. 4,194,221 to Stoffel and U.S. Pat. No. 4,811,115 to Lin et al., the pertinent portions of which are incorporated herein.

Figure 2:
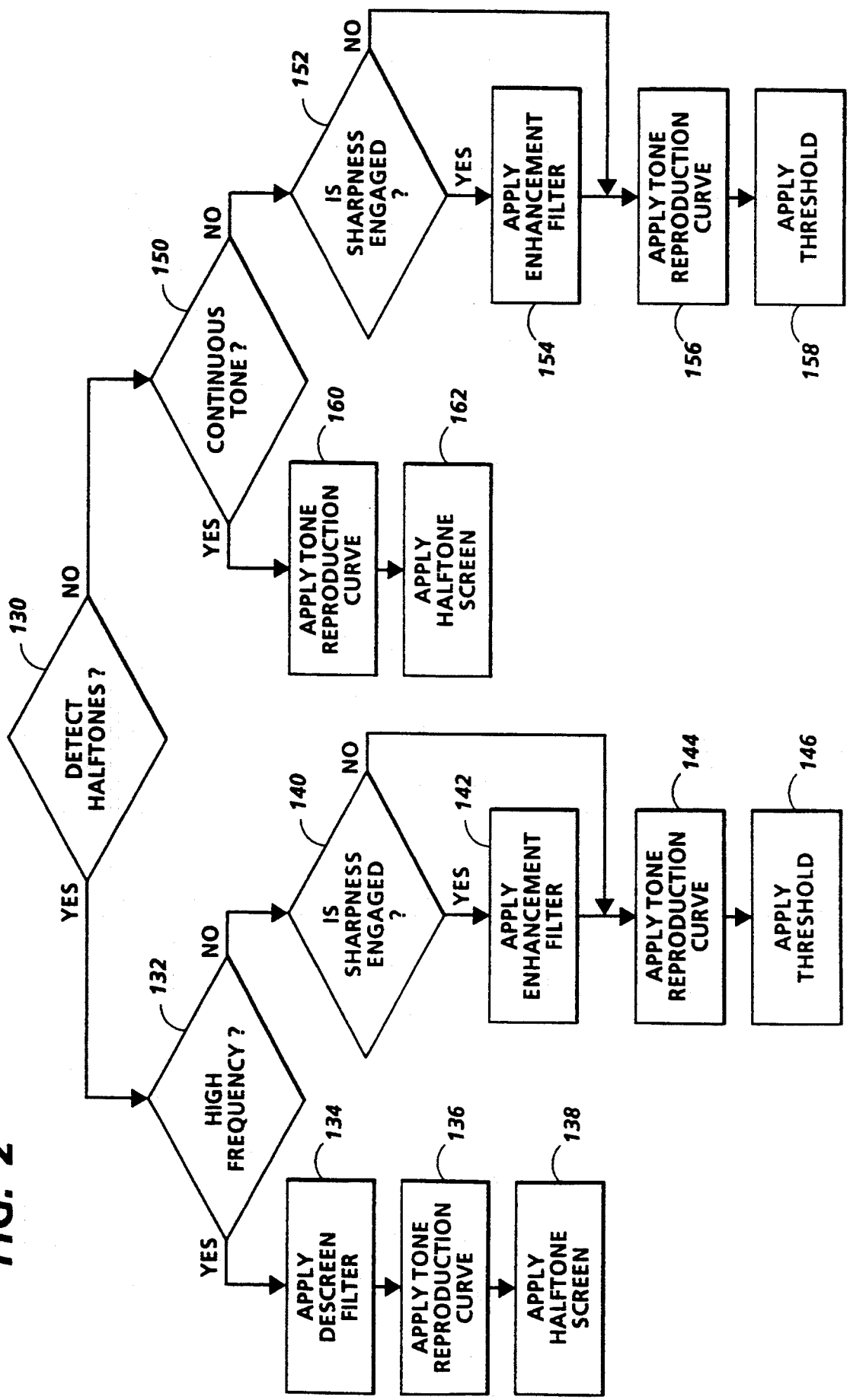
FIG. 2 is a flow chart illustrating one mode of decision making followed by the processing apparatus of FIG. 1.

Referring to FIG. 2, operation of the arrangement 100, in a "full" segmentation mode, is explained in further detail. If, at step 130, it is determined that an image type is a halftone, then the autocorrelator 104 determines, via step 132, whether the halftone is high or low frequency. If the halftone is high frequency, then a descreen filter, a tone reproduction curve and a halftone filter are preferably applied via steps 134, 136 and 138. If, on the other hand, the halftone is low frequency, and sharpness is engaged (step 140) then an enhancement filter, a tone reproduction curve and a threshold are applied via steps 142, 144 and 146. When sharpness is not engaged, step 142 is omitted.

If, at step 130, it is determined that the image type is not a halftone, then the discriminator 110 determines, via step 150, whether image type is line copy or continuous tone. If it is determined that line copy is present, then the image data is processed with steps 152, 154, 156 and 158 in a manner similar to that used for low frequency halftones, as discussed above. If it is determined that continuous tone is present, then the image data is processed with steps 160 and 162 in a manner similar to that used for high frequency halftones, as discussed above, except that a descreen filter is not applied.

Figure 3:
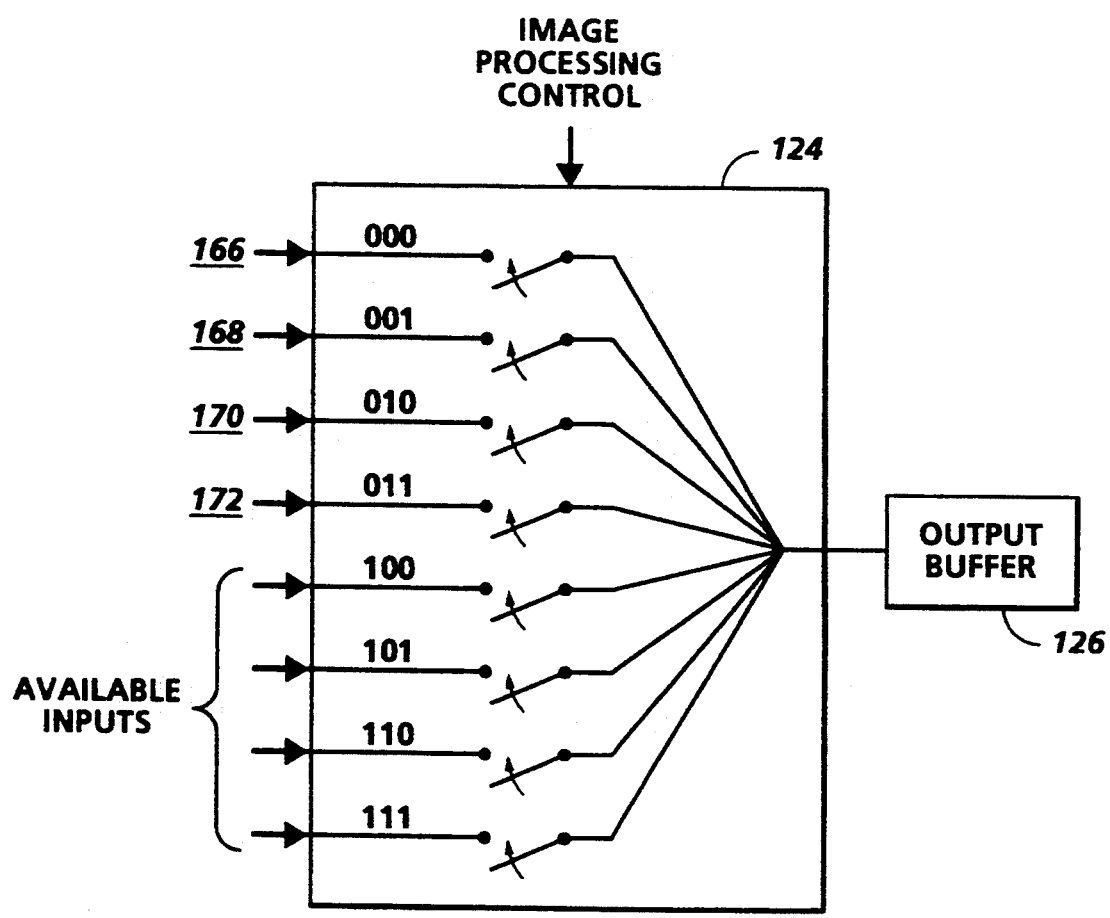
FIG. 3 is a schematic view of an image data output selector.

Referring to FIGS. 1 and 3, the processing sections 114, 116, 118 and 120 deliver output signals 166, 168, 170 and 172, respectively, to the bus 122. Additionally, selector 124, as shown in further detail in FIG. 3, comprises a suitable electronic switch operable in response to coded inputs to couple one of the output lines 166, 168, 170 and 172 to the output buffer 126. For descriptive purposes, selector 124 is shown as a multiplexing arrangement with an eight position switch effective on a binary "000" control signal from image processing control 108 to couple the output 166 to the output buffer 126, on a binary "001" control signal from image processing control 108 to couple the output 168 to the output buffer 126, on a binary "010" control signal from the image processing control 108 to couple the output 170 to the output buffer 126 and on a binary "011" control signal from the image processing control 108 to couple the output 172 to the output buffer 126. In the illustrated embodiment of FIG. 3, there are four additional lines, the significance of which additional will be discussed in further detail below.

The above description of FIGS. 1 and 2 relates to an image processing arrangement in which each image type of a document, with up to four image types, can be classified or "segmented" distinctly. That is, when the arrangement or "segmentor" 100 is in the full segmentation mode, regions are classified, on a pixel-by-pixel basis, as fitting into one of the four image types. Under certain circumstances, regions can be misclassified, and the misclassified regions can be reproduced in an incorrect manner to produce poor image quality. For example, the system is capable of misclassifying a high frequency halftone as a continuous tone or a photograph.

Figure 4:
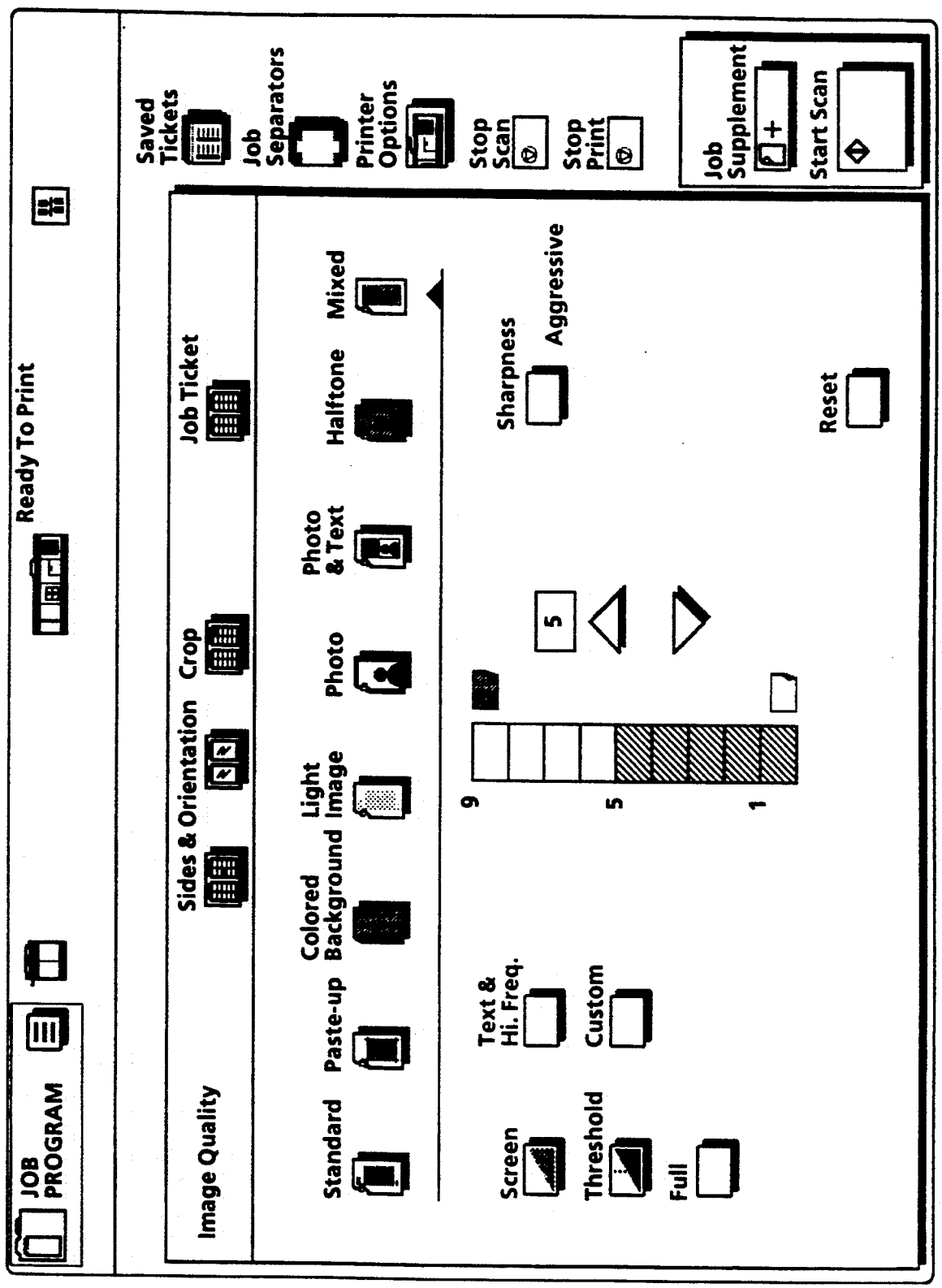
FIG. 4 is an elevational view of a user interface screen with a dialog for setting a segmentation mode in the image processing apparatus of FIG. 1.
Figure 5:
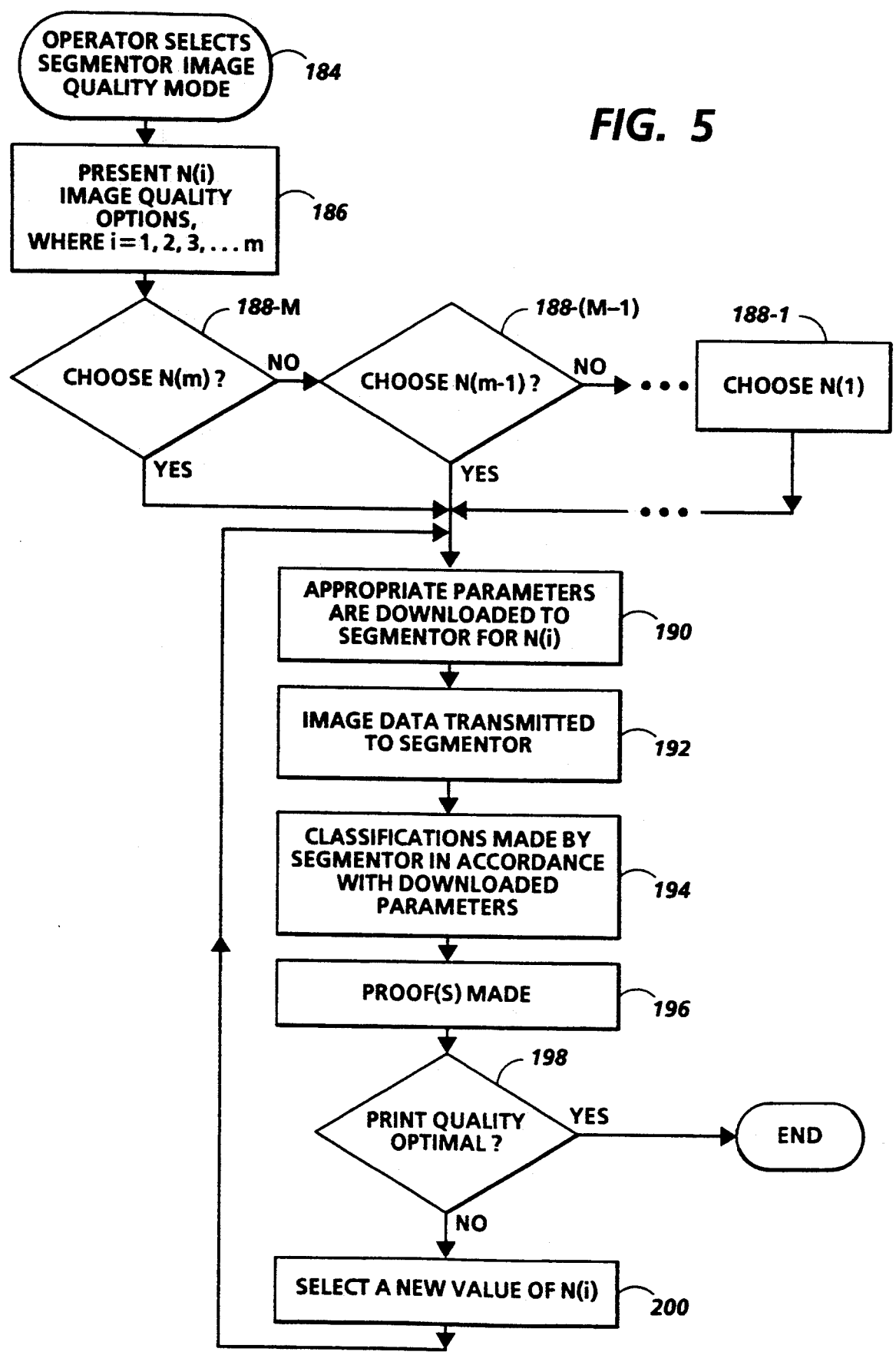
FIG. 5 is a flow diagram illustrating a technique for setting the segmentation mode.

Referring to FIGS. 4 and 5, a technique for minimizing misclassification of image types is shown. Referring specifically to FIG. 4, a user interface screen, representing a segmentation dialog, is shown. In a first embodiment, consistent with the disclosure of U.S. Pat. No. 4,194,221 to Stoffel, the icon labeled "Mixed" is selected, and then the "Full" icon, of the "Photo Treatment" section, is selected. Preferably, the system default is to the full mode.

As discussed above, a system user may wish, on the basis of certain known qualities of the input image, to use a segmenting program other than the full mode. As shown in the illustrated embodiment of FIG. 5, the user can choose from one of the "Screen", "Threshold", "Text & High Frequency" and "Custom" modes. Referring to FIGS. 1 and the following Tables I–III, the significance of the modes will be discussed further. As shown in FIG. 1, the Image Processing Control 108 is associated with a section designated by the title "SEGMENTATION CONTROL", the Segmentation Control section being designated by the numeral 180.

The segmentation control 180 serves to map the outputs of the sections 114, 116, 118 and 120 with two or three control signals so that pixels of selected image types are delivered to the Output buffer 126 in accordance with one of the selected modes. In one example, this mapping function is preferably accomplished through the use of a plurality of look-up tables. That is each time the image processing control determines that a given image type is present in a region of the input image, it looks to a selected one of the look-up tables to decide which of outputs 166, 168, 170 and 172 should be coupled with the output buffer 126. As illustrated in Table I, when the Screen mode is selected, low frequency halftones are mapped to text.

TABLE I

| Image Type | Control Signal |
| --- | --- |
| High Frequency | 000 |
| Low Frequency | 010 |
| Line/Text | 010 |
| Continuous Tone | 011 |

In one example, it has been found that this sort of mapping is useful in processing.

As illustrated in Table II, when the Threshold mode is selected, continuous tones and low frequency halftones are mapped to text.

TABLE II

| Image Type | Control Signal |
| --- | --- |
| High Frequency | 000 |
| Low Frequency | 010 |
| Line/Text | 010 |
| Continuous Tone | 010 |

In one example, it has been found that this sort of mapping is useful in processing.

As illustrated in Table III when the Text and High Frequency mode is selected, continuous tones and low frequency halftones are mapped to high frequency halftone.

TABLE III

| Image Type | Control Signal |
| --- | --- |
| High Frequency | 000 |
| Low Frequency | 000 |
| Line/Text | 010 |
| Continuous Tone | 000 |

In certain instances, it has been found that processing a section of continuous tone as a high frequency halftone provides optimal processing for color halftones.

Other mappings are contemplated by the present disclosed embodiment, and these mappings can be implemented through use of one or more Custom modes. For example, a user may encounter an input image having one or more regions which are invariably misclassified by the segmentor. In this case the segmentor user may wish to develop a customized mapping which accommodates for such misclassification.

Additionally, the custom mode can be used to enhance the structure and operation of FIG. 1. In particular, a user can modify one of the processing sections or add a processing section. When a processing section is added, one of the available four lines of the selector 124, along with an appropriate control signal, can be used to deliver the processed pixels of the added processing section to the output buffer 126. In one example a high frequency processor, particularly suited to enhance details or minimize moire, could be added to the arrangement 100 and used as an alternative processing section to section 114. In this example, with the custom mode selected, one of the control signals "100", "101", "110" or "111" could be used to direct the processed pixels of the customized high frequency section, when appropriate, to the output buffer 126.

Referring to FIG. 5, once the operator selects the segmentor icon (FIG. 4) (step 184), s/he is presented with the various options (step 186) as discussed above. For ease of discussion, the various options or modes are designated by the variable N(i). For example, the Screen mode is designated as option N(1), the Threshold mode as N(2), and so on. Steps 188-1, 188-2, . . . 188-M, illustrate that the user can choose a mode from one of m modes. Upon choosing one of the modes (step 190), appropriate parameters for obtaining the mapping function, stored in one of the look-up tables, are downloaded to the segmentation control 180 of FIG. 1. As image data is transmitted to the segmentor 100 (step 192), classifications are made in accordance with the downloaded parameters of segmentation control 180 (step 194). To verify the quality of the image processing, proofs can be made (step 196) and if print quality is acceptable (step 198), then the process is ended; otherwise, a new mode is chosen (step 200) and the process is repeated.

It should be appreciated that the mode setting function of the segmenting arrangement (FIG. 2 and 4) could be set automatically. In one embodiment, automatic setting could be accomplished by 1) developing a reference histogram for each mode, 2) prescanning an input image, with a scanner, for developing a representative histogram, 3) determining the reference histogram to which the representative histogram corresponds and 4) setting one of the modes in accordance with this determination. The reference histograms could be set by a manufacturer of the segmentor or by a user of the system in which the segmentor is installed. In one example of operation, if a representative histogram indicates that only text and high frequency halftones are present, then the Screen mode is set automatically. In another embodiment, a scan mode could be used to influence the automatic setting of segmentor modes. For example, when the scan mode is for "recirculating document handling" it can be assumed that continuous tones are not present, since photographs are not typically handled by recirculating document handlers.

Numerous features of the disclosed embodiment will be appreciated by those skilled in the art. First, the disclosed segmentor promotes visually pleasing image quality. That is, by providing an operator with the capability to select a mode, from a plurality of modes, which particularly suits the operator's image processing needs, the risk of encountering misclassified regions is minimized. Second, a mode can be chosen manually or automatically. In one example an input image can be prescanned and, based on the perceived image types, an optimum mode can be obtained. Finally, the operator is provided with a wide variety of image processing approaches. In many circumstances, one of the approaches will be particularly suited for the operator's requirements. This maximizes the operator's ability to reproduce complex documents optimally in a consistent manner.

What is claimed is:

1. A printing apparatus for processing image data represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, the processed image data being transmitted to and outputted with an output device, comprising:

a memory section, communicating with the determining means, the first image processing module and the second image processing module, for buffering the plurality of image-related signals;

an output section, communicating with the output device, for receiving image-related signals processed with a selected one of the first image processing module and the second image processing module, the image-related signals being used to control the output device; and a control section, communicating with the determining means, the first image processing module, the second image processing module and said output section, said control section including a segmentation controller adapted to cause the output signal from the second image processing module to be transmitted to said output section when image-related signals of the first image type are transmitted, in parallel, to both the first image processing module and the second image processing module.

2. The printing apparatus of claim 1, further comprising a scanner for generating the image data with said memory section being operatively associated with said scanner.

3. The printing apparatus of claim 1, wherein the output device comprises means for marking a representation of the image data on a substrate.

4. A printing apparatus for processing image data represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, the processed image data being transmitted to and outputted with an output device, comprising:

a first memory section, communicating with the determining means, the first image processing module and the second image processing module, for buffering the plurality of image-related signals;

an output section, communicating with the output device, for receiving image-related signals processed with the second image processing module, the image-related signals being used to control the output device; and a control section, communicating with the determining means, the first image processing module, the second image processing module and said output section, said control section causing the output signal from the second image processing module to be transmitted to said output section when the selected image-related signal is of the first image type, wherein said control section includes a look-up table, said control section causing the output signal to be transmitted from the second image processing module to said output section with said look-up table.

5. The printing apparatus of claim 4, wherein said look-up table includes a first control signal and a second control signal mapped with the first image type and the second image type, respectively.

6. The printing apparatus of claim 5, wherein said control section causes the output signal to be transmitted from the second image processing module to said output section when the second control signal is transmitted to said output section.

7. A multi-mode image processing apparatus for processing image data represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising:

a memory section, communicating with the determining means, the first image processing module and the second image processing module, for buffering the plurality of the image-related signals;

an output section for receiving image-related signals processed with the first image processing module and the second image processing module; and a control section communicating with the determining means, the first image processing module, the second image processing module and said memory section, said control section including programmable means for directing said output section to receive the selected image-related signal from a selected one of the first image processing module and the second image processing module, said programmable directing means operating in one of a first mode in which the output signal from the first image processing module is received by said output section when image-related signals of the first image type are transmitted, in parallel, to both the first image processing module and the second image processing module, and a second mode in which the output signal from the second image processing module is received by said output section when image-related signals of the first image type are transmitted, in parallel, to both the first image processing module and the second image processing module.

8. The multi-mode image processing apparatus of claim 7, further comprising means for disposing the programmable directing means into a selected one of the first mode and the second mode.

9. The multi-mode image processing apparatus of claim 8, wherein said disposing means disposes said programmable directing means into the selected one of the first mode and the second mode automatically.

10. A multi-mode image processing apparatus for processing image data represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising:

a memory section, communicating with the determining means, the first image processing module and the second image processing module, for buffering the plurality of the image-related signals;

an output section for receiving image-related signals processed with the first image processing module and the second image processing module; and a control section communicating with the determining means, the first image processing module, the second image processing module and said memory section, said control section including programmable means for directing said output section to receive the selected image-related signal from a selected one of the first image processing module and the second image processing module, said programmable directing means operating in one of a first mode in which the output signal from the first image processing module is received by said output section when the selected image-related signal is of the first image type and a second mode in which the output signal from the second image processing module is received by said output section when the selected image-related signal is of the first image type, wherein said programmable means includes a first switch for disposing the first mode into an on position or an off position and a second switch for disposing the second mode into an on position or an off position.

11. The multi-mode image processing apparatus of claim 10, wherein a selected one of said first and second switches is disposed in the on position manually.

12. The multi-mode image processing apparatus of claim 9, wherein said programmable directing means is automatically disposed in the selected one of the first mode and the second mode by determining all of the image types present in the image data and setting the mode with the determined image types.

13. An image processing apparatus for processing an image represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising:

a first memory section, communicating with the determining means, the first image processing module and the second image processing module, for buffering the plurality of the image-related signals;

a second memory section for receiving image-related signals processed with the first image processing module and the second image processing module; and a control section, communicating with the determining means, the first image processing module, the second image processing module and said second memory section, said control section including a segmentation controller adapted to cause the output signal from the second image processing module to be received by said second memory section when image-related signals of the first image type are transmitted, in parallel, to the first image processing module and the second image processing module.

14. The image processing apparatus of claim 13, further comprising a selector, communicating with said control section, the first image processing module, the second image processing module and the second memory section, for managing the flow of the output signal between the first image processing module, the second image processing module and said second memory section.

15. An image processing apparatus for processing an image represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising:

a first memory section, communicating with the determining means, the first image processing module and the second image processing module, for buffering the plurality of the image-related signals;

a second memory section for receiving image-related signals processed with the first image processing module and the second image processing module; and a control section, communicating with the determining means, the first image processing module, the second image-processing module and said second memory section, said control section causing the output signal from the second image processing module to be received by said second memory section when the selected image-related signal is of the first image type, wherein said control section causes the output signal from the second image processing module to be transmitted from the second image processing module to said second memory section by transmitting a control signal to said selector.

16. The image processing apparatus of claim 15, in which said selector includes a plurality of inputs corresponding with the respective outputs of said image processing modules and an output, wherein said selector includes means for coupling the input of the second image processing module with the selector output in response to receiving the control signal.

17. The image processing apparatus of claim 14, wherein said control section includes progammable means for directing said selector to receive the output signal from the second image processing module when the determining means determines that the selected image related signal is of either the first or second image type.

18. An image processing apparatus for processing an image represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising:

a first memory section, communicating with the determining means, the first image processing module and the second image processing module, for buffering the plurality of the image-related signals;

a second memory section for receiving image-related signals processed with the first image processing module and the second image processing module; and a control section, communicating with the determining means, the first image processing module, the second image processing module and said second memory section, said control section causing the output signal from the second image processing module to be received by said second memory section when the selected image-related signal is of the first image type, wherein said control section includes programmable means for directing said selector to receive the output signal from the second image processing module when the determining means determines that the selected image-related signal is of either the first or second image type and said programmable means includes a programmable look-up table which maps the first and second image types to a first control signal and a second control signal, respectively.

19. An image processing apparatus for processing an image represented by a plurality of pixels corresponding with a plurality of image-related signals., respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising:

a first memory section, communicating with the determining means, the first image processing module and the second image processing module, for buffering the plurality of the image-related signals;

a second memory section for receiving image-related signals processed with the first image processing module and the second image processing module;

a control section, communicating with the determining means, the first image processing module, the second image processing module and said second memory section, said control section causing the output signal from the second image processing module to be received by said second memory section when the selected image-related signal is of the first image type; and a third image processing module adapted to process image-related signals of a third image type, the third image processing module communicating with said first memory section, said control section and said second memory section, said control section causing the output signal from the second image processing module to be received by said second memory section when the selected image-related signal is of the third image type.

20. A method of processing an image represented by a plurality of pixels corresponding with a plurality of image-related signals, respectively, a selected one of the image-related signals corresponding with a first image type and being processed, in parallel, with means for determining the image type of selected ones of the image-related signals, a first image processing module and a second image processing module, the first image processing module having an output and being adapted to process images of the first image type and the second image processing module having an output and being adapted to process images of a second type, comprising the steps of:

buffering the plurality of the image-related signals; and causing the output signal from the second image processing module to be transmitted to an output section when image-related signals of the first image type are transmitted, in parallel, to the first image processing module and the second image processing module.

21. The method of claim 20, further comprising the step of performing the causing step in one of two modes, wherein in the first mode the output of the second image processing module is received by the output section when the selected image related signal is of the first image type and wherein in the second mode the output of the first image processing module is received by the output section when the selected image related signal is of the first image type.

22. The method of claim 21, further comprising the step of determining the mode in which the method is to be performed.

23. The method of claim 22, wherein said determining step comprises determining the mode automatically.

24. The method of claim 20, wherein said causing step includes transmitting a control signal to the output section to cause the selected image-related signal to be received at the output section.

25. The method of claim 20, further comprising the step of scanning the image to generate the plurality of image related signals.

26. The method of claim 20, further comprising the step of producing a print with the image related signals.

* * * * *